Oct. 4, 1927.
W. RIEFFERT
1,644,611
BALL BEARING
Filed Feb. 24, 1926
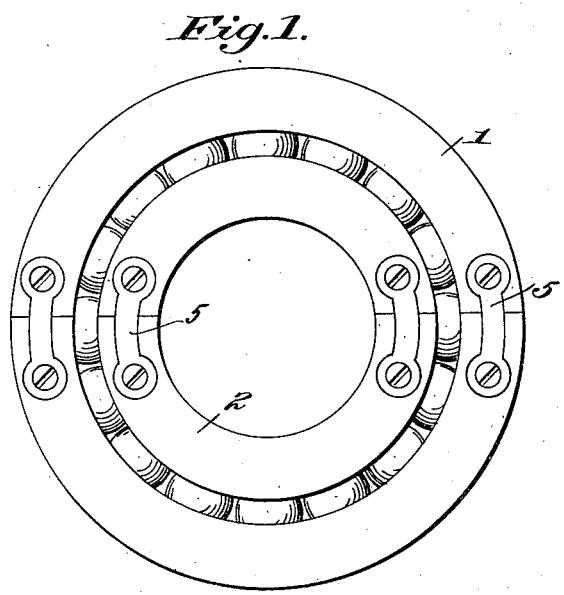
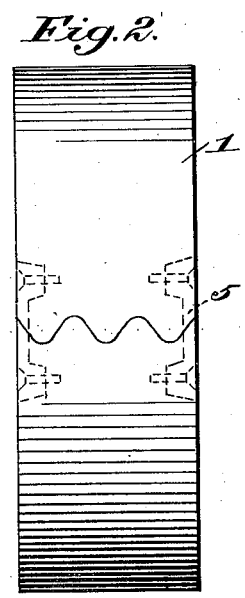
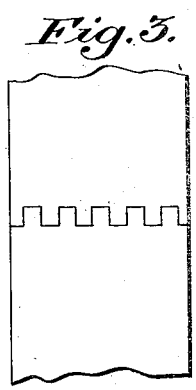
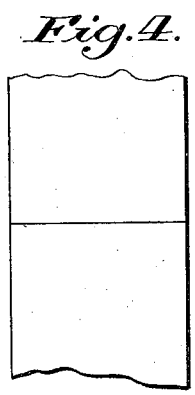
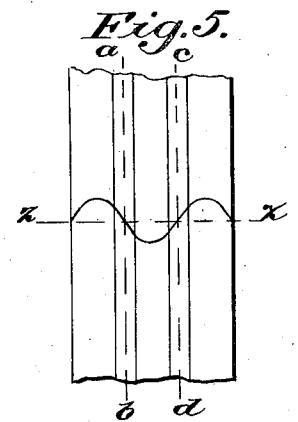
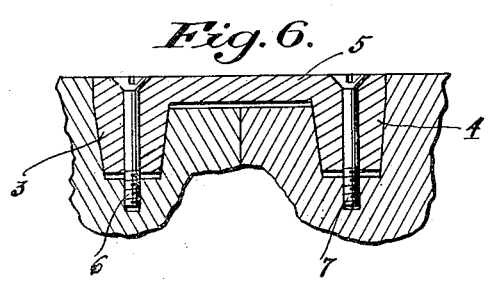
Inventor:
Wilhelm Rieffert,
by
Atty Patented Oct. 4, 1927.

1,644,611

UNITED STATES PATENT OFFICE.

WILHELM RIEFFERT, OF COLOGNE VINGST, GERMANY, ASSIGNOR TO DR. H. DUX COMPANY, INC., OF JACKSONVILLE, FLORIDA.

BALL BEARING.

Application filed February 24, 1926, Serial No. 90,354, and in Germany February 28, 1925.

The purpose of the present invention is a subdivided ball or roller bearing, the essential feature of which consists in that the points at which the bearing halves are divided, are detachably connected together by inserted connecting means adapted to be drawn together or tightened, whereby the contacting surfaces of the divided or split halves of the bearing may be undulated, zig-zag or flat.

This connecting means comprises two bridged cones which are forced by screws into corresponding conical openings of the halves superposed on each other with flat or corrugated contacting surfaces. Injury to the shaft is entirely precluded, by the corrugated (undulated) form of the halves, and smooth operation of the balls or rollers is assured, without danger of injuring the races or the balls and rollers.

By means of this invention, it will be possible in the future, to mount a ball or roller bearing on shafts which, by reason of curves, contracted portions, tap or flange mountings, do not permit the application of an ordinary ball or roller bearing. The new two-part ball or roller bearing may be easily applied or added to shafts, without undue removal and replacing, with the same accuracy and facility as a closed ball bearing.

An exemplary embodiment of the subject of the invention is illustrated in the accompanying drawing, in which:

Fig. 1 is a side elevation of a subdivided bearing.

Fig. 2 is a lateral elevation with undulated contacting surfaces.

Fig. 3 shows zig-zag contacting surfaces.

Fig. 4 is a flat surface at the point of contact.

Fig. 5 shows a partial inner view of a bearing race with undulated contacting surfaces, and Fig. 6 a sectional view of connecting means adapted to tighten the two halves of the race-way.

The annular ball bearing shown on Figs. 1 and 2 consists of an outer race 1 and an inner race 2. Each individual race consists of two halves, whereby their contacting surfaces may be undulated, zig-zag, notched, or flat. Axial displacement of the two race halves is completely precluded in all but the last case. The undulated sections are shown in Figs. 2 and 5, while the notched and flat forms are illustrated in Figs. 3 and 4 respectively. The rigid, but detachable connection of the two race halves of the annulus is effected by a bridging means, which operates to tighten, and which, as may be seen from Figs. 2 and 6, consists of two connected cones 3, 4, adapted to be rigidly connected together to form one piece by means of a connecting segment 5. According to the external form of the bridge each bearing race is provided at the sides, at the division points of each race, with two oppositely disposed fitted depressions, which extend over the joints and in which the bridge is inserted and attached by means of screws 6, 7, so that there are no projecting parts on the race sides. The bridges are made of hardened steel. The two cones 3 and 4 exert firm traction on the corresponding sectional surfaces of the race halves, so that the points of subdivision are firmly united by these bridges. With the undulated form of the sectional surfaces the race grooves for the balls must be arranged as shown in Fig. 5. The center lines $a$—$b$, $c$—$d$, thereof must intersect at the zero line $z$—$z$ of the undulations; thereby, the pressure of the balls or rollers, on passage from one race half to the other, is uniformly distributed over the points of section on the race surfaces of both race halves, thus preventing premature wear or deviation of the ball or roller grooves at the points of section.

It is immaterial to the subject of this invention whether the race be subdivided into two or into more segments. For very large sized ball-bearings it may be advantageous to make the race of a great number of parts.

The advantages offered by a subdivided ball or roller bearing are that it may be easily mounted on any shaft without changing position and without jamming, and the entire bearing or the balls per se may be easily interchanged. The section surfaces may be made in the plane of the race diameter or somewhat outside thereof.

It is also to be noted that the production of this two-part roller or ball bearing requires no special apparatus, but any machine shop with modern lathe equipment can easily construct them.

Having thus described my invention, what I claim is:

1. A ball or roller bearing, comprising a race formed of a plurality of segmental sections with conical depressions formed in the sides of the race sections near the joints, and removable connecting means with conical projections bridging the joints at the side of the race with the conical projections seated in the respectively shaped depressions in the sections for securing and drawing the same together.

2. A ball or roller bearing, comprising a race formed of a plurality of segmental sections contacting with each other across a uniformly irregular surface and having conical depressions formed in the sides of the race sections near the joints, and removable connecting means with conical projections bridging the joints at the side of the race with the conical projections seated in the respectively shaped depressions in the sections for securing and drawing the same together.

3. A ball or roller bearing, comprising a race formed of a plurality of segmental sections with conical depressions formed in the sides of the race sections near the joints, removable connecting means with conical projections bridging the joints at the side of the race with the conical projections seated in the respectively shaped depressions in the sections, and screws extending through the projections and into the depressions for fastening the bridging connecting means to the sections for securing and drawing them together.

In testimony whereof I have signed my name to this specification.

WILHELM RIEFFERT.